Oct. 22, 1940.  S. F. THUNBERG  2,219,121
RADIO INTERFERENCE ELIMINATOR
Filed Feb. 8, 1940
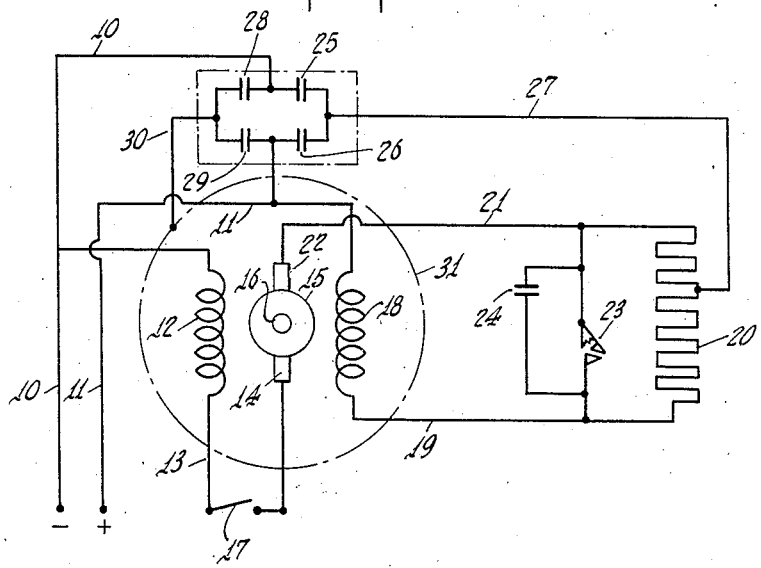
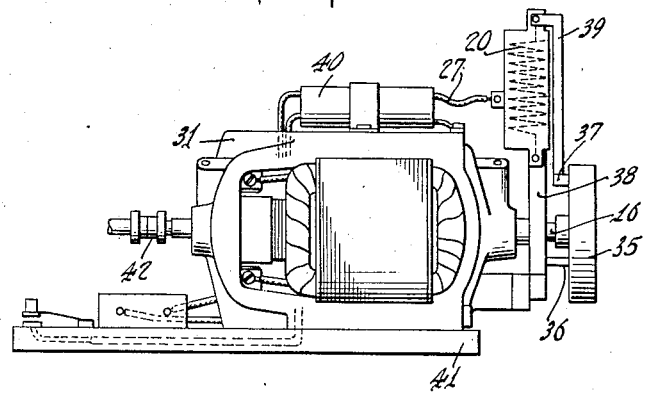
INVENTOR.
Sigurd Ferdinand Thunberg
BY Thomas C. Bitts
his ATTORNEY.

Patented Oct. 22, 1940

2,219,121

UNITED STATES PATENT OFFICE 2,219,121

RADIO INTERFERENCE ELIMINATOR

Sigurd Ferdinand Thunberg, V:A Bjorneborg, Ronninge, Sweden, assignor to Electrolux Corporation, Dover, Del., a corporation of Delaware Application February 8, 1940, Serial No. 317,816
In Sweden February 1, 1933

8 Claims. (Cl. 171—97)

My invention relates to electric motors and more particularly to improved means for eliminating or reducing radio interference resulting from the opening and closing of electric motor circuits.

In electric motors which are subject to fluctuating loads, speed regulation may be obtained by providing a resistance which may be cut into and out of the circuit by means of a switch responsive to variations in motor speed. Under certain conditions of load, this switch may open and close frequently, thus producing highly objectionable and continuing radio interference.

I have found, if I connect such resistance through a capacitance with both sides of the electric circuit of the motor, that the interference resulting from the opening and closing of the switch will be substantially or entirely eliminated. In addition, the resistance may be connected in like manner with the metallic frame or housing of the motor.

Further objects and advantages of my invention will be apparent from the following description considered in connection with the accompanying drawing, which forms a part of this specification and of which:

Fig. 1 is a wiring diagram of an arrangement in accordance with my invention; and Fig. 2 is a side view of a device constructed in accordance with my invention.

Referring more particularly to Fig. 1 reference characters 10 and 11 designate the two conductors for supplying current to a single-phase series wound universal electric motor. Conductor 10 is connected to one terminal of a field coil 12, the other terminal of which is connected by means of a conductor 13 with a brush 14 which contacts a commutator 15 mounted on the armature shaft 16. A switch 17 may be provided for starting and stopping the motor. This switch may obviously be at any place in the motor circuit, and is shown as being located in the conductor 13.

The conductor 11 is connected to one terminal of a field coil 18, the other terminal of which is connected by means of a conductor 19 to one end of a resistance 20. The opposite end of the resistance is connected by means of a conductor 21 with a brush 22, which likewise contacts the armature 15.

A switch 23 is connected across the conductors 19 and 21 in shunt with the resistance 20. This switch is provided with any well-known means for opening and closing it in response to variations in speed of the motor armature, so that the switch opens upon an increase in speed, thus cutting the resistance 20 into the circuit, and closes upon a decrease in speed, thus cutting the resistance out. If desired, a condenser 24 may be shunted across the contacts of switch 23 so as to tend to quench the spark produced by opening of the contacts.

A condenser means, which in the embodiment illustrated includes the condensers 25 and 26, is connected across the conductors 10 and 11, and a conductor 27 connects the mid-point of this condenser means with a tap on the resistance 20. The location of this tap with respect to the ends of the resistance is preferably such as to provide substantially equal impedance in the branch circuit including the conductor 27, the upper part of the resistance 20, the armature 15 and the field coil 12, and in the branch circuit including the conductor 27, the lower part of the resistance 20 and the field coil 18.

In addition, a condenser means including the condensers 28 and 29 may be connected across the conductors 10 and 11, with a conductor 30 connecting the mid-point with the metallic frame or housing 31 of the motor.

The operation of the above-described device will be largely apparent. Upon a decrease in load imposed on the motor, the speed of the latter increases, whereupon the switch 23 opens, thus cutting the resistance 20 into the circuit. Due to the presence of this additional resistance in the motor circuit, the speed of the motor decreases until the switch 23 closes. This repeated opening and closing of the switch 23 is productive of radio waves which will be picked up by nearby radio sets, thus producing interference. I have discovered that, by connecting a tap of the resistance 20 with a condenser means connected across the conductors which supply current to the motor, the production of these interfering waves will be substantially eliminated. The condensers 28 and 29, not only reduce or eliminate radio interference produced by the brushes and commutator, but also aid in reducing the interference produced by the switch 23.

In Fig. 2, there is shown a side view of a motor embodied in my invention. The switch 23, shown in Fig. 1, and its speed responsive operating mechanism is contained within a member 35 mounted for rotation with the armature shaft 16. Member 35 is provided with a pair of slip rings which cooperate with sliding contacts 36 and 37 to lead the current to and from the switch 23. The resistance 20 may be mounted on a stationary arm 38 which connects one end of the resistance with the sliding contact 36. The other sliding contact, 37, is mounted on an arm 39 which connects it to the opposite end of the resistance 20.

The condensers 25, 26, 28 and 39 may be constructed as a single unit 40, which is shown as being mounted on the motor frame 31.

Inasmuch as the frame of the motor is connected to the circuit through condensers, it is desirable that the motor be mounted on an insulating support, such as the base 41, and that the armature shaft be connected to the load through an insulating coupling 42. Thus, in the event of a breakdown in one of the condensers, which would permit current to reach the motor frame, such current could not injure a person operating the device with which the motor is associated.

If desired, the resistance 20 may be provided with an insulating covering, on the opposite side of which may be placed a metallic sheet or the like. Thus, the resistance constitutes one plate, while the sheet constitutes the other plate, of a condenser which may take the place of a condenser means connected with current carrying parts of the system.

While I have shown and described a more or less specific embodiment of my invention, it is to be understood that this has been done for the purpose of illustration only and that the scope of my invention is not to be limited thereby, but is to be determined by the appended claims.

What I claim is:

1. In an electric motor, conductors for supplying current to said motor, a switch in one of said conductors, a resistance in shunt with said switch, and capacitance means for connecting an intermediate point of said resistance with said conductors.

2. In an electric motor, conductors for supplying current to said motor, a switch in one of said conductors, a resistance in shunt with said switch, condenser means across said conductors, and a conductor connecting an intermediate point of said condenser means with said resistance.

3. In an electric motor, a metallic frame, conductors for supplying current to said motor, a switch in one of said conductors, a resistance in shunt with said switch, and capacitance means for connecting an intermediate point of said resistance with said frame.

4. In an electric motor, a metallic frame, conductors for supplying current to said motor, a switch in one of said conductors, a resistance in shunt with said switch, and capacitance means for connecting an intermediate point of said resistance with said frame and with said conductors.

5. In an electric motor, a metallic frame, conductors for supplying current to said motor, a switch in one of said conductors, a resistance in shunt with said switch, a pair of condenser means across said conductors, a conductor connecting the mid-point of one of said condenser means with said resistance, and a conductor connecting the mid-point of the other condenser means with said frame.

6. In an electric motor, conductors for supplying current to said motor, a switch in one of said conductors, a resistance in shunt with said switch, a capacitive connection between said conductors, a further capacitive connection between said first mentioned capacitive connection and an intermediate point of said resistance, said motor and said resistance being included in two branch circuits, said intermediate point being so located as to provide substantially equal impedance of the branch circuits.

7. In an electric motor, conductors for supplying current to said motor, a switch in one of said conductors, a resistance in shunt with said switch, two condensers connected in series across said conductors, an intermediate point of said condensers connected with an intermediate point of said resistance, said motor and said resistance being included in two branch circuits, the intermediate point of the resistance being so located as to provide substantially equal impedance of the branch circuits.

8. In combination, an electric motor having an armature winding and a plurality of field windings, conductors for supplying current to said motor, a switch in the motor circuit, a resistance in shunt with said switch, condenser means connected across said conductors, a conductor connecting an intermediate point of said condenser means with an intermediate point of said resistance, the armature winding, a field winding and the portion of said resistance to one side of the intermediate point thereof being included in one branch circuit, and another field winding and the remaining portion of said resistance being included in a second branch circuit, the intermediate point of the resistance being so located as to substantially equalize the impedance of said branch circuits.

SIGURD F. THUNBERG.